United States Patent [19]

Ogawa et al.

[11] Patent Number: 5,177,597

[45] Date of Patent: Jan. 5, 1993

[54] TELEVISION SIGNAL MULTIPLEXING AND DEMULTIPLEXING SYSTEM

[75] Inventors: Yoshihiko Ogawa; Seijiro Yasuki, both of Yokohama; Kiyoyuki Kawai, Yokosuka, all of Japan

[73] Assignee: Kabushiki Kaisha Toshiba, Kawasaki, Japan

[21] Appl. No.: 623,026

[22] Filed: Dec. 6, 1990

[30] Foreign Application Priority Data

Dec. 7, 1989 [JP] Japan .................. 1-316381

[51] Int. Cl.⁵ .......................................... H04N 11/06
[52] U.S. Cl. ................................... 358/12; 358/141; 358/16
[58] Field of Search ........................ 358/11, 12, 13, 14, 358/16, 141, 142, 15, 23

[56] References Cited

U.S. PATENT DOCUMENTS

| | | | |
|---|---|---|---|
| 4,498,097 | 2/1985 | Fujimoto | 358/12 |
| 4,605,950 | 8/1986 | Goldberg et al. | 358/11 |
| 4,949,166 | 8/1990 | Isnardi | 358/16 |

FOREIGN PATENT DOCUMENTS

| | | |
|---|---|---|
| 0285894 | 12/1986 | Japan . |
| 0097086 | 4/1988 | Japan . |
| 1-229585 | 9/1989 | Japan . |

OTHER PUBLICATIONS

T. Kukinuki et al., "Fully Compatible EDTV for Improving Both Y and Color Signals by Using a Single New Subcarrier". I.E.E.E. Transactions on Consumer Electronics 1988 International Conference on Consumer Electronics, Part I, vol. 34, No. 3, Aug. 1988, pp. 469-473, IEEE New York, US.

T. Ohira et al., "Orthogonal Transform Coding System for NTSC Color Television Signals", IEEE Trans. Communications, vol. COM-26, No. 10, Oct. 1978, pp. 1454-1463.

Primary Examiner—James J. Groody
Assistant Examiner—Michael H. Lee
Attorney, Agent, or Firm—Cushman, Darby & Cushman

[57] ABSTRACT

A television signal multiplexing and demultiplexing system includes a signal separation circuit for separating from a composite color television signal a plurality of first television signals serving as additional information for making the quality of a television picture higher and a second television signal. A matrix operation circuit performs a vertical matrix operation on the first television signals so as to dispose each of the first television signals in a different vertical band, thereby producing operation outputs. A delay circuit delays the operation outputs by different amounts of delay to produce delayed outputs. A multiplexing circuit multiplexes the delayed outputs on different horizontal scanning lines of the second television signal to produce a multiplexed output. A demultiplexing circuit demultiplexes the multiplexed output into the operation outputs and the second television signal. A recovering circuit recovers the first television signals by performing a matrix operation which is the inverse of the matrix operation on the separated operation outputs to recover the first television signal.

11 Claims, 8 Drawing Sheets

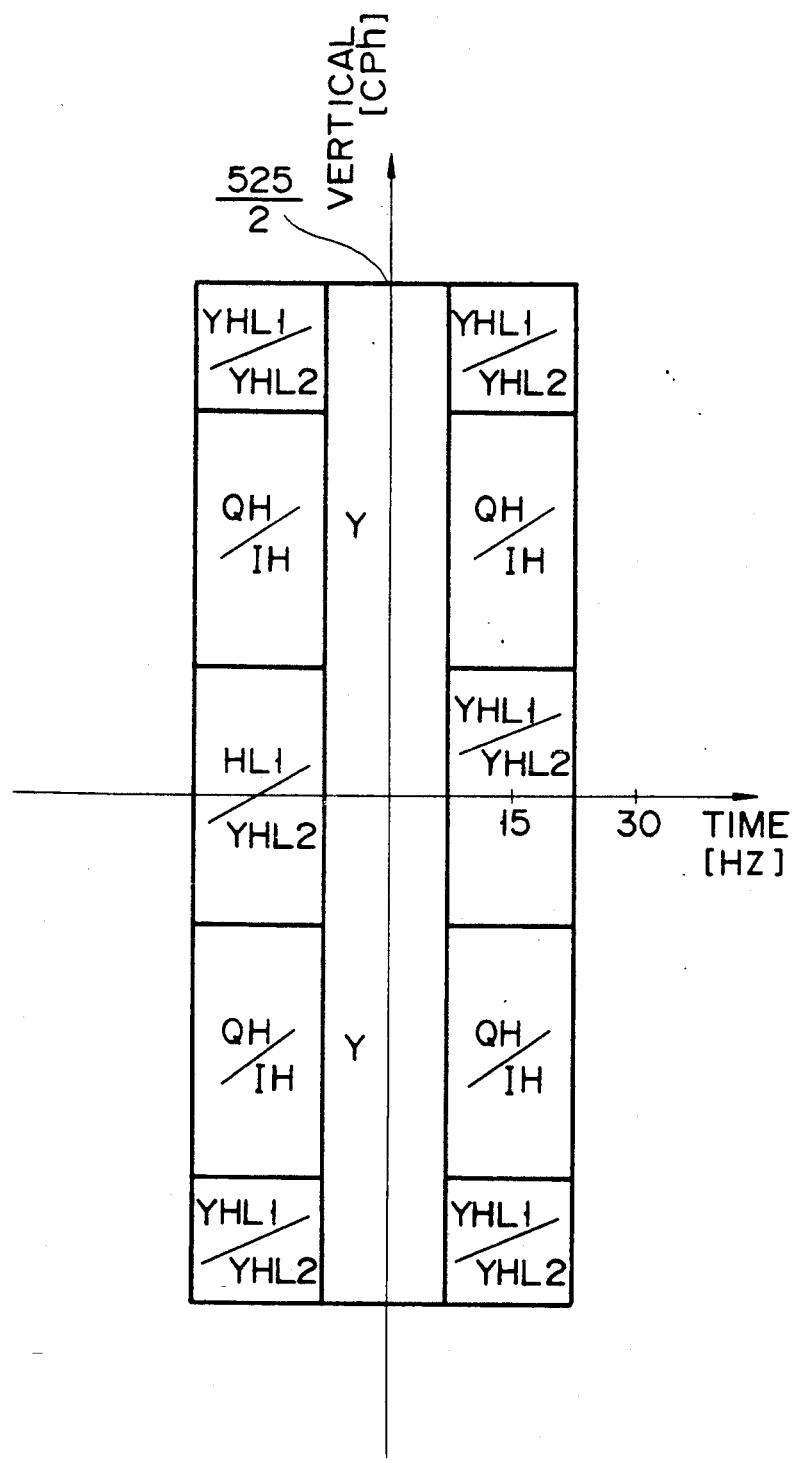
F I G. 5B

TELEVISION SIGNAL MULTIPLEXING AND DEMULTIPLEXING SYSTEM

BACKGROUND OF THE INVENTION

1. Field of the Invention

The present invention relates to a television signal multiplexing and demultiplexing system for multiplexing and demultiplexing additional information utilized for implementing additional features, such as a high-definition picture and a wide picture frame, in a television broadcasting system.

2. Description of the Related Art

In the field of television broadcasting, intensive research and development for the production of high-quality television pictures have been made recently.

Ways of producing a high-quality television picture include making the aspect ratio of the TV picture frame larger and making the definition of a TV picture higher. By making the aspect ratio of TV picture frame larger than the existing aspect ratio, it becomes possible to achieve a high-quality TV picture in terms of the sense of presence as obtained from a wide picture. In the case of the high-definition TV picture, on the other hand, the bandwidth of a TV signal is made greater, whereby a high-quality TV picture is achieved in terms of horizontal resolution of the picture.

Even if the greater-aspect-ratio broadcasting system and/or the high-definition broadcasting system is realized, it is desirable that compatibility with the existing broadcasting systems be taken into account. This is because the newly developed broadcasting system and the existing broadcasting system are considered to exist simultaneously for the time being.

In order to keep the new broadcasting system and the existing broadcasting system compatible, additional information adapted for implementing the greater aspect ratio and/or higher definition may be multiplexed with a television signal of the existing broadcasting system. Moreover, it is desired that the multiplexing be performed within the baseband of the television signal of the existing broadcasting system. This is to allow existing television broadcasting equipment to deal with a television signal of the new broadcasting system as it is.

An exemplary system for multiplexing, as additional information, information adapted to implement the greater aspect ratio with a television signal of the existing broadcasting system within its baseband is disclosed in Japanese Patent Application No. 63-56850 (hereinafter referred to as reference 1).

In the multiplexing system disclosed in reference 1, diagonal high-frequency components of a luminance signal of the NTSC system are used, both in a still picture and a motion picture, to multiplex the additional information for the greater aspect ratio.

A system for multiplexing, as additional information, information for implementing the high-definition with a television signal of the existing broadcasting system is disclosed, for example, in "Fully Compatible EDTV for Improving Both Y and Color signals by Using a Single New Subcarrier", IEEE Transaction on Consumer Electronics, Vol. 34, No. 3, AUGUST 1988 (hereinafter referred to as reference 2).

In the multiplexing system disclosed in reference 2, information for high definition is multiplexed with a television signal of the NTSC system at the time of production of a still picture.

The information for high definition includes a high-definition component (hereinafter referred to as a YH component) contained in a luminance signal and a high-definition component (hereinafter referred to as a QH component) contained in a Q signal which is one of color difference signals.

FIG. 7 illustrates a vertical-time spectrum representing multiplexing regions for the YH and QH components. The YH component is multiplexed in spectral regions of the first and third quadrants which are unused at the time of a still picture. On the other hand, the QH component is multiplexed with diagonal high-frequency components having a vertical frequency of 525/2 [cph]. Note that QH' is a reflected component due to interlaced scanning of the QH component. The reflected component QH' appears in positions corresponding to a time frequency of 30 [Hz].

According to the multiplexing system, the horizontal resolution of a still picture can be increased. However, the horizontal resolution of a motion picture cannot be increased because additional information cannot be multiplexed at the time of production of a motion picture. This is because, in the case of a motion picture, the spectrum spreads in the direction of the time axis so that a television signal and additional information are superimposed upon each other and thus cannot be separated from each other on the receiving side. However, even if additional information can be multiplexed only at the time of production of a still picture, it will not be a serious problem because the high-definition version of a picture is effective in a still picture but not so effective in a motion picture.

The foregoing relates to conventional exemplary multiplexing systems for making the aspect ratio of a picture frame greater and for making the definition of a picture higher.

In making the picture quality high it is desired that both of the greater-aspect-ratio picture system and the high-definition picture system be adopted. To this end, it will occur to us to adopt both of the above-described multiplexing systems simultaneously.

Since, however, the multiplexing region for the additional information for the great aspect ratio in reference 1 and the multiplexing region for the QH component in reference 2 are identical with each other, the two multiplexing systems cannot be adopted simultaneously. To solve this problem, it is required to make the multiplexing region for the additional information in reference 1 and the multiplexing region for the QH component in reference 2 differ from each other.

However, each of the multiplexing system in reference 1 and the multiplexing system reference 2 is a system in which a specific region for diagonal high-frequency components is merely removed and then additional information is multiplexed in the region. Thus, the multiplexing systems are adaptable to the case where one piece of additional information is multiplexed or the case where plural pieces of additional information differing in horizontal band are multiplexed but not adaptable to the case where plural pieces of additional information of the same horizontal band are multiplexed. This is because, in such a case, the plural pieces of additional information are superimposed upon one another and cannot be separated from one another at the receiving end.

SUMMARY OF THE INVENTION

It is therefore an object of the present invention to provide a television signal multiplexing and demultiplexing system which permits a plurality of television signals with the same horizontal band to be multiplexed on the same horizontal band without being superimposed upon one another.

To attain the object, a television signal multiplexing and demodulating system according to the present invention comprises:

signal separating means for separating a composite color television signal into a plurality of first television signals serving as additional information for making the quality of a television picture higher and a second television signal;

matrix operation means for performing a matrix operation on the plurality of first television signals separated by the separating means vertically so as to dispose each of the first television signals in a different vertical band, thereby producing a plurality of operation outputs;

delay means for delaying the plurality of operation outputs by different amounts of delay to provide delayed outputs;

multiplexing means for multiplexing the delayed outputs from the delay means of different horizontal scanning lines of the second television signal to provide a multiplexed output signal;

demultiplexing means for demultiplexing the multiplexed output signal from the multiplexing means into the plurality of operation outputs and the second television signal; and recording means for performing a matrix operation which is the inverse of the matrix operation performed by the matrix operation means on the plurality of operation outputs demultiplexed by the demultiplexing means to recover the plurality of first television signals.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4, 5A, 5B, and 5C are spectrum diagrams useful in understanding the operation of the circuit of FIG. 1;

DETAILED DESCRIPTION OF THE PREFERRED EMBODIMENTS

Figure 1:
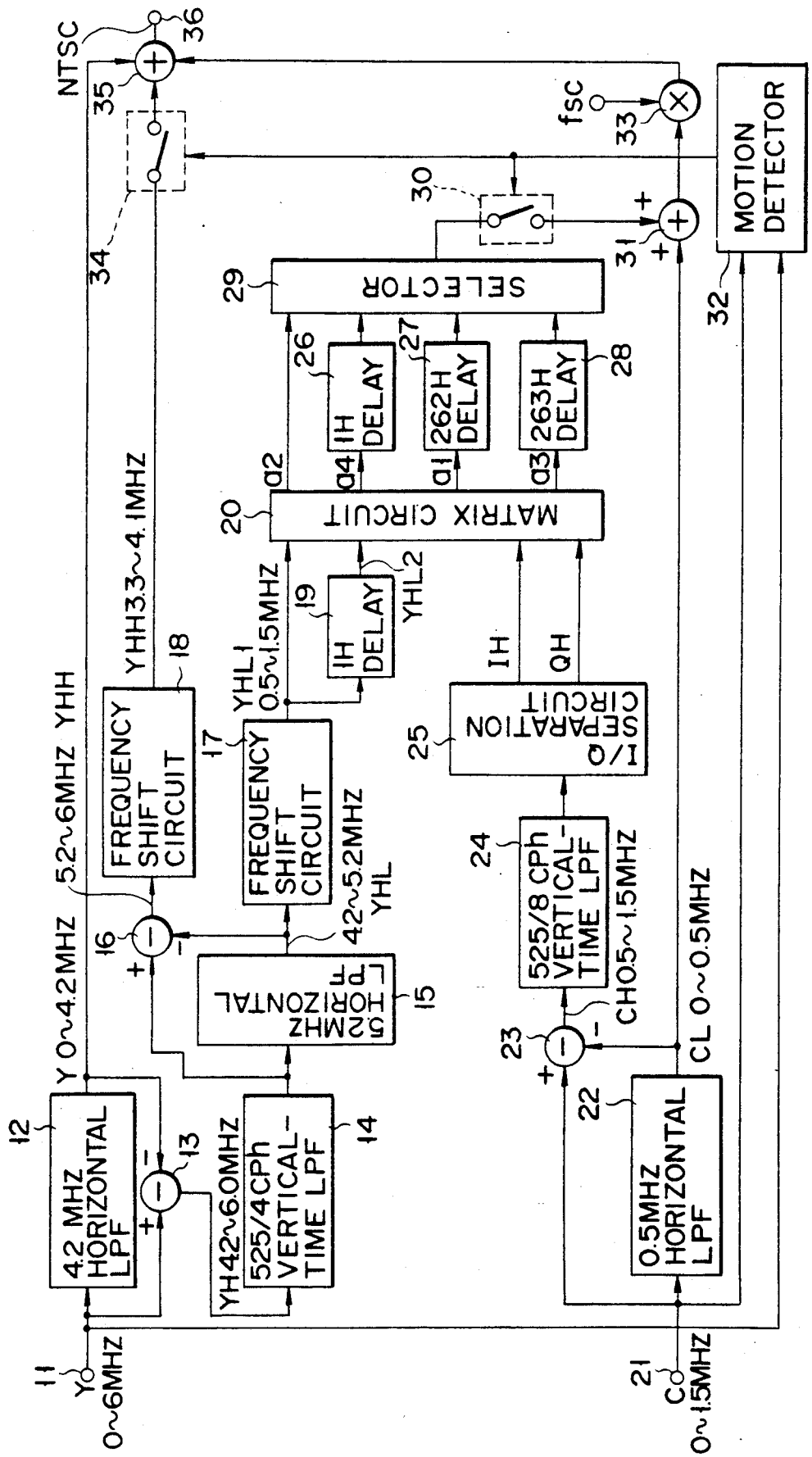
FIG. 1 is a block diagram of the multiplexing side of a television signal multiplexing and demultiplexing system embodying the present invention.
Figure 2:
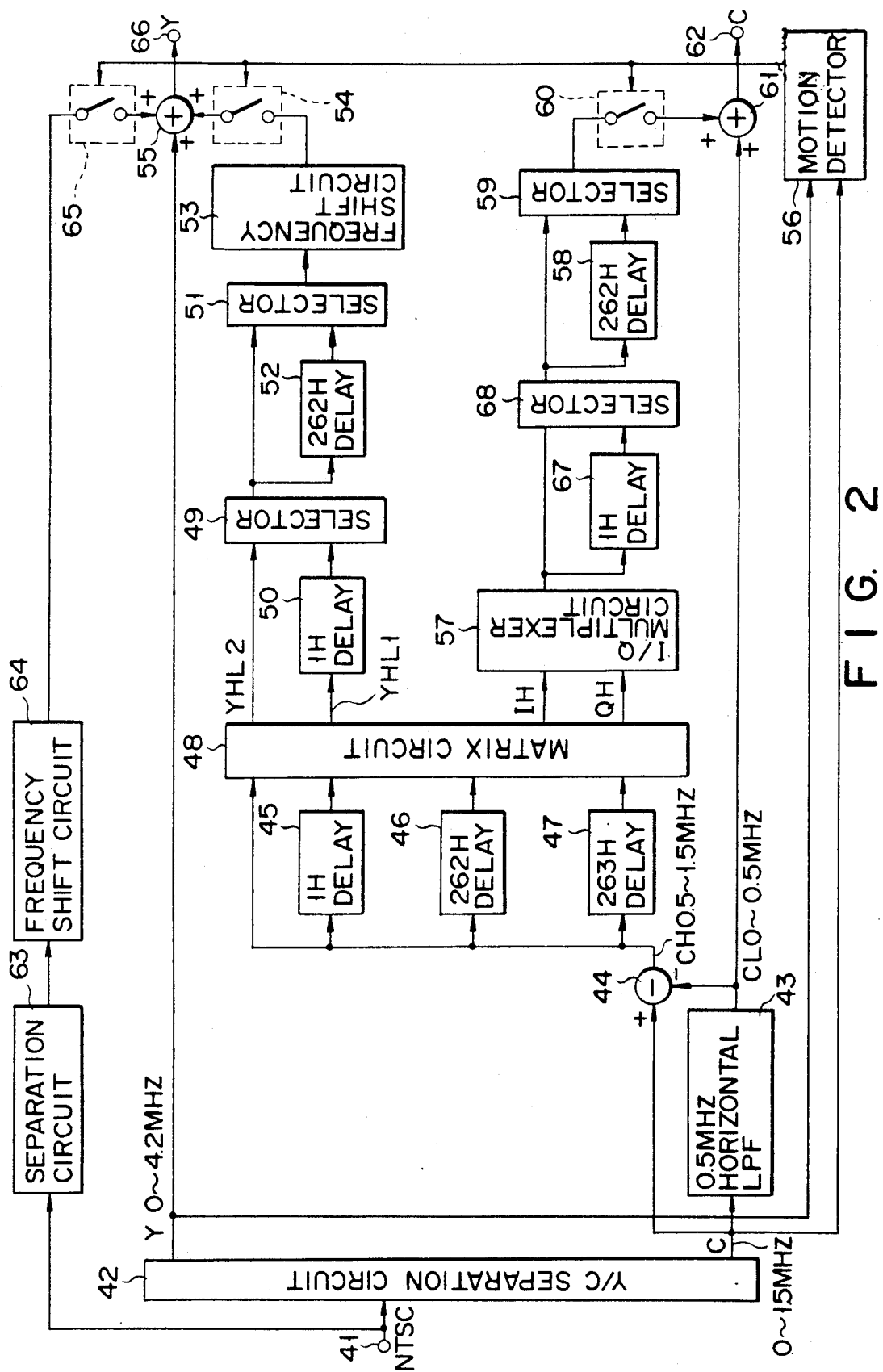
FIG. 2 is a block diagram of the demultiplexing side of the television signal multiplexing and demultiplexing system.

FIG. 1 is a block diagram of a multiplexer and FIG. 2 is a block diagram of a demultiplexer of a television signal multiplexing and demultiplexer system according to an embodiment of the present invention.

In the following description the multiplexing and demultiplexing system of the present invention is supposed to process additional information adapted for implementing a high-definition television picture.

In FIG. 1, 11 denotes an input terminal which receives a broadband luminance signal or Y signal having a horizontal band of 0 to 6 MHz. The broadband Y signal is separated into a signal component of a horizontal band of 0 to 4.2 MHz and a signal component of a band of 4.2 to 6 MHz by a horizontal lowpass filter (hereinafter referred to as LPF) having a cutoff frequency of 4.2 MHz and a subtracter 13.

The 0- to 4.2-MHz signal component output from the horizontal LPF 12 is applied, as a Y-signal component of the NTSC system, to a summing circuit 35 which will be described later. The 4.2- to 6-MHz signal component output from the subtracter 13 is applied, as a YH-signal component, to a vertical-time LPF 14.

The LPF 14 is adapted to limit the vertical band of the YH-signal component to 525/4 [cph] for subsequent multiplexing process which will be described later. The output of the LPF 14 is separated into a signal component of a horizontal band of 4.2 to 5.2 MHz, i.e., a high-definition signal component of the luminance signal and a signal component of a horizontal band of 5.2 to 6 MHz by means of a horizontal LPF 15 with a cutoff frequency of 5.2 MHz and a subtracter 16. Hereinafter the 4.2- to 5.2-MHz YH-signal component is referred to as the YHL component and the 5.2- to 6-MHz YH-signal component is referred to as the YHH component.

The YHL component output from the horizontal LPF 15 is applied to a frequency shift circuit 17 where it is modulated with a carrier having a frequency of 8/5 fsc (=5.7 MHz, fsc=color subcarrier frequency), whereby the YHL component is frequency shifted to a horizontal band of 0.5 to 1.5 MHz.

The YHH component output from the subtracter 16 is applied to a frequency shift circuit 18 where it is modulated with a carrier of a frequency of 13/5 fsc (=9.3 MHz). Consequently the YHH component is frequency shifted to a horizontal band of 3.3 to 4.1 MHz.

The YHL component output from the frequency shift circuit 17 is applied to a matrix circuit 20 directly as YHL1 and through a 1-H delay circuit 19, which provides a time delay of one horizontal line time, as YHL2. That is, signals from two horizontal scanning lines are applied to the matrix circuit 20 simultaneously.

In FIG. 1, 21 designates an input terminal at which a C signal is applied. The C signal is a broadband C signal in which the band of its Q signal is 0 to 1.5 MHz, which is the same as that of the I signal.

The broadband C signal is separated into a signal component of a horizontal band of 0 to 0.5 MHz and a signal component of a horizontal band of 0.5 to 1.5 MHz by means of a horizontal LPF 22 having a cutoff frequency of 0.5 MHz and a subtracter 23. Hereinafter the former is referred to as the CL component and the latter is referred to as the CH component.

The CL component output from the horizontal LPF 22 is applied to a summing circuit 31 which will be described later. On the other hand, the CH component output from the subtracter 23 is applied to a vertical-time LPF 24 where its vertical bandwidth is limited to 525/8 [cph] for the subsequent multiplexing process.

The CH component output from the LPF 24 is separated into a IH signal component, which is a high-frequency component of the I signal, and a QH signal component, which is a high-definition component of the Q signal, by an I/Q separation circuit 25. The IH and QH components are applied to a matrix circuit 20.

The matrix circuit 20 performs a vertical matrix operation on the YHL1, YHL2, IH and QH components for four horizontal scanning lines. Since both the IH and QH components have their vertical bandwidth limited to 525/8 [cph], they need only one horizontal scanning line of data for four horizontal scanning lines. On the other hand, the YHL components have their bandwidth limited to 525/4 [cph], they need two horizontal scanning lines of data (YHL1, YHL2).

The matrix circuit 20 converts the IH, QH, YHL1 and YHL2 components to four pieces of data a1, a2, a3 and a4 by means of the vertical matrix operation. The matrix operation is performed using, for example, a fourth-order Walsh matrix. The fourth-order Walsh matrix is represented by $$\begin{pmatrix} a1 \\ a2 \\ a3 \\ a4 \end{pmatrix} = \frac{1}{2} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} IH \\ QH \\ YHL1 \\ YHL2 \end{pmatrix} \quad (1)$$

Figure 3:
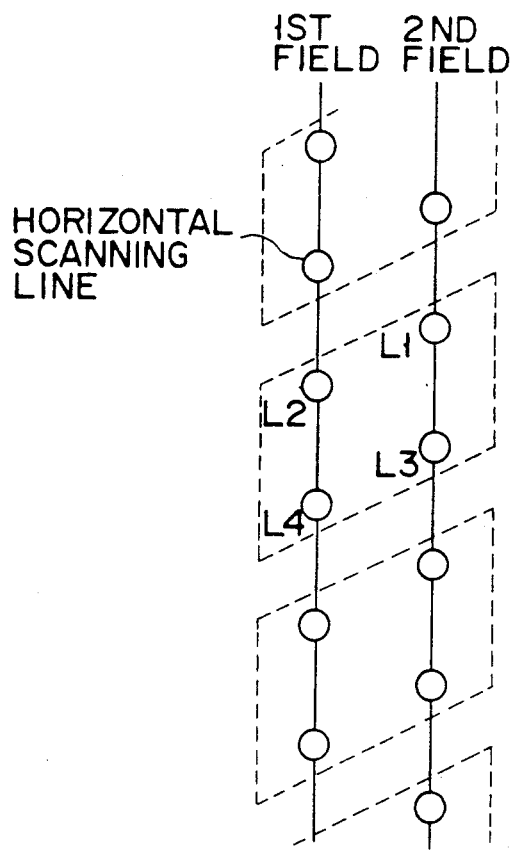
FIG. 3 is a diagram useful in understanding the operation of the circuit of FIG. 1.

The data a1, a2, a3 and a4 output from the matrix circuit 20 are allocated to four horizontal scanning lines L1, L2, L3 and L4, respectively, within one frame of an NTSC signal (CL component) shown in FIG. 3.

The allocation is performed by a 1H delay line 26, a 262H delay line 27, a 263H delay line 28 and a selector 29. That is, the selector 29 selects the data a2 output from the matrix circuit 20 on the horizontal scanning line L2. The data a4 delayed by one horizontal line period (1H) by the 1H delay line 26 is selected on the horizontal scanning line L4. The data a1 delayed by 262H by the 262H delay line 27 is selected on the horizontal scanning line L1. Finally, the data a3 delayed by 263H by the 263H delay line 28 is selected on the horizontal scanning line L3.

The output of the selector 29 is applied to the summing circuit 31 via a switch 30 for addition to the CL component output from the LPF 22. Thereby, the data a1, a2, a3 and a4 are multiplexed on the NTSC signal (CL component) with a1, a2, a3 and a4 allocated to the corresponding horizontal scanning lines L1, L2, L3 and L4 of the NTSC signal.

The switch 30 is controlled by a motion detector 32. The motion detector 32 is responsive to the Y signal and C signal applied to the input terminals 11 and 21 to detect the motion of a picture. In the case of a still picture the switch 30 is placed in the on state; while, in the case of a motion picture, it is placed in the off state. Thus, the output of the selector 29 is combined with the CL component only in the case of a still picture. This is due to the fact that, in the case of a motion picture, the spectrum of a Y signal extends in the direction of time and thus the Y signal and the high-definition component cannot be separated from each other on the demodulating side. This is also due to the fact that the high-definition component is effective only in the case of a still picture.

Figure 4:
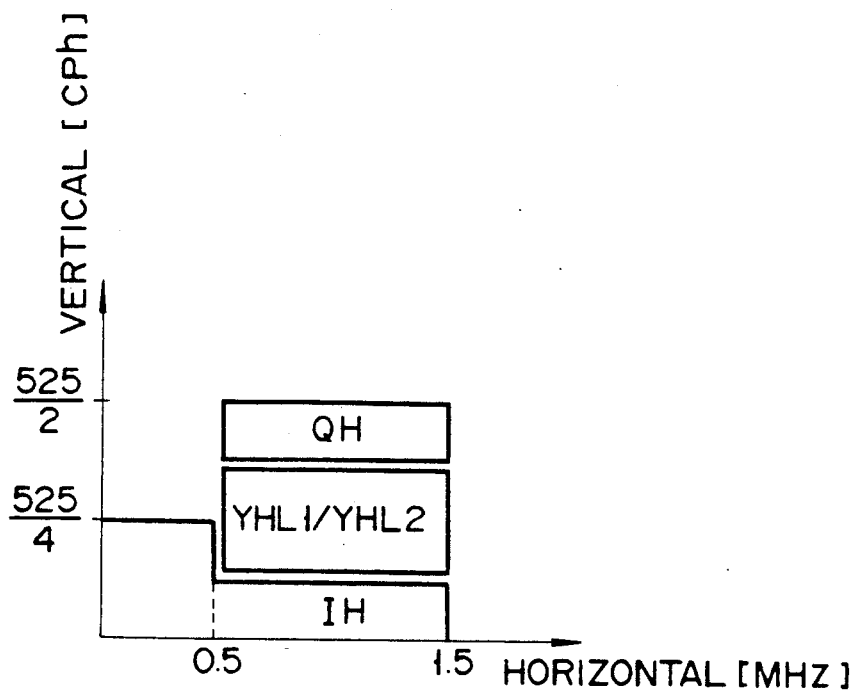

FIG. 4 illustrates a spectrum when the data a1, a2, a3 and a4, which are obtained by performing the vertical matrix operation according to the Walsh matrix represented by equation (1), are multiplexed on the four horizontal scanning lines L1, L2, L3 and L4, respectively, illustrated in FIG. 3.

As illustrated, the IH component is positioned in a direct-current region in the vertical direction by the matrix operation of equation (1). The YHL components are positioned in a region at a vertical frequency of 525/4 [cph]. The QH component is positioned in a region at a vertical frequency of 525/2 [cph]. Therefore, the IH, YH and QH components can be multiplexed without being superimposed upon one another because they are equal in horizontal band but are different from one another in vertical band. And moreover, since the data a1, a2, a3 and a4 resulting from the matrix operation on the IH, YH and QH components are allocated to different horizontal scanning lines L1, L2, L3 and L4, the original IH, YH and QH components can be recovered from the data a1, a2, a3 and a4 on the demodulating side.

In addition, since the YHL and QH components are positioned in the vertical high-frequency region by the above-described matrix operation, even if a multiplex signal is received by an existing television receiver with no recovering means for the YHL and QH components, the interference of the YHL and QH components is not almost noticeable.

The multiplexing of the YHL and QH components are performed only in the case of a still picture and thus FIG. 4 shows the spectrum of a still picture. In this case, the original vertical band of the CL component is 525/4 [cph].

An output signal of the summing circuit 31, which has the spectrum of FIG. 4, is applied to a modulation circuit 33 where it is modulated with a color subcarrier with the frequency fsc. Whereby, a C signal having the color signal band of the NTSC system is obtained. The C signal is applied to a summing circuit 35 where it is added to the Y signal output from the LPF 12. The spectra of the output of the summing circuit are illustrated in FIGS. 5A to 5C.

Figure 5A:
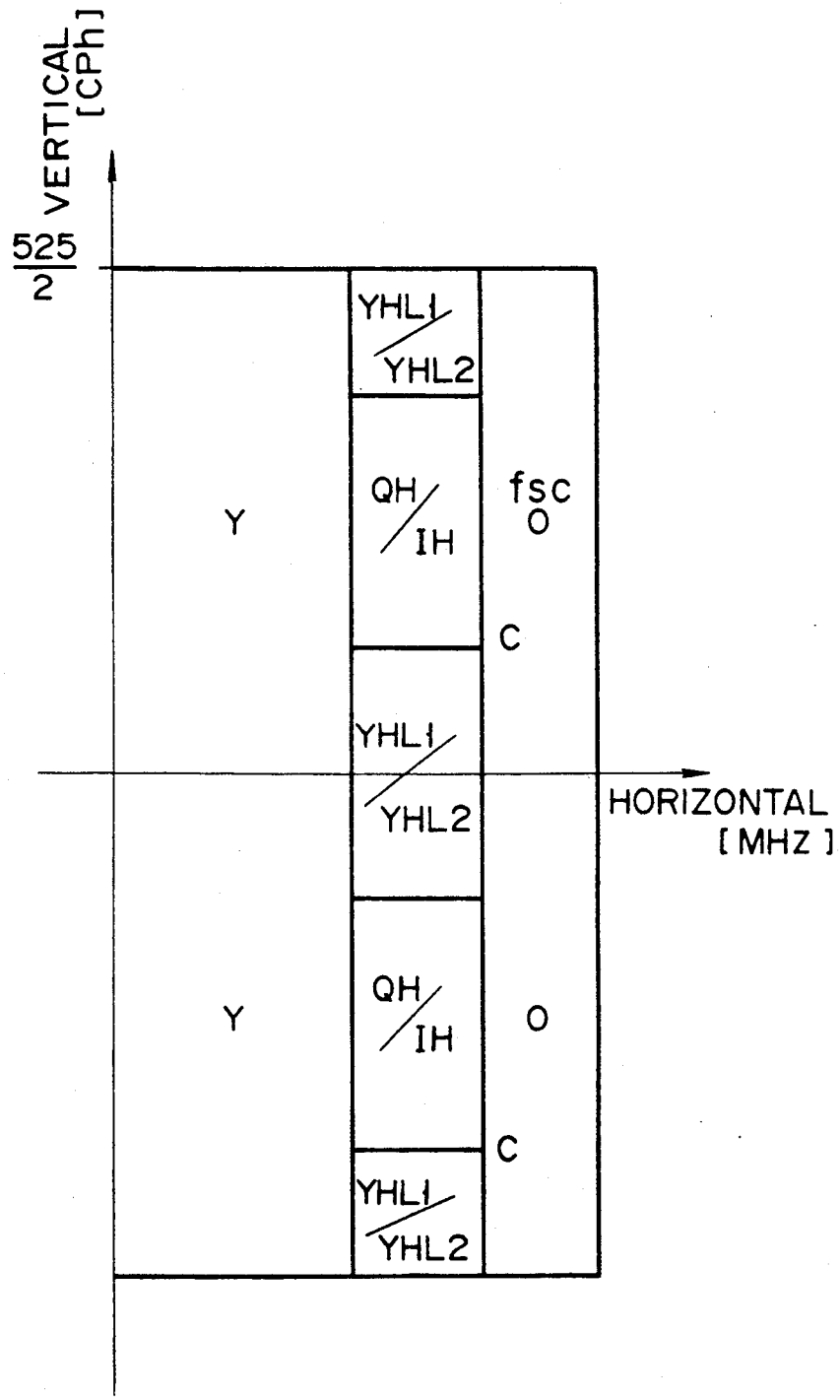
Figure 5C:
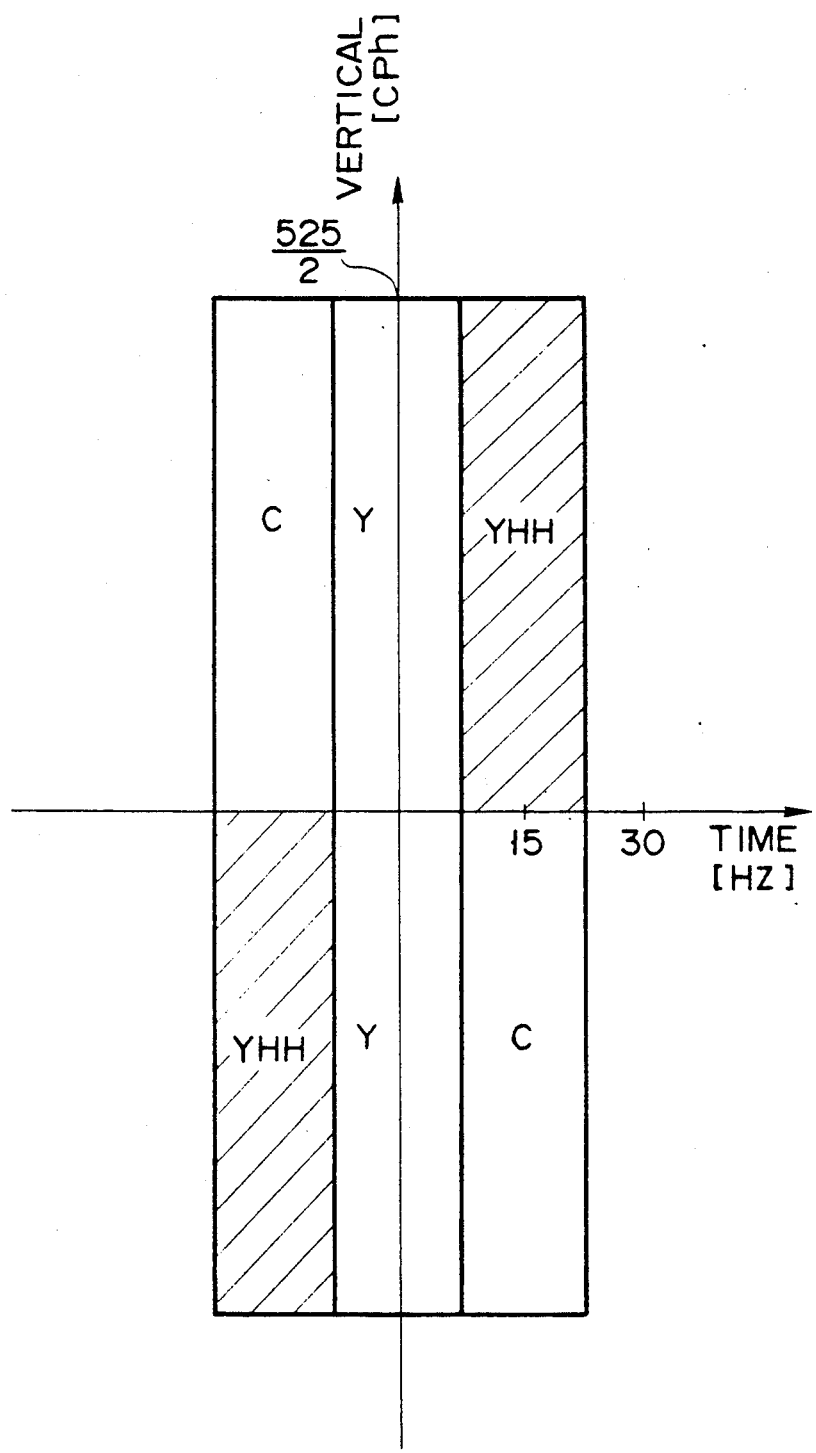

FIG. 5A illustrates a horizontal-vertical spectrum, FIG. 5B illustrates a time-vertical spectrum in the neighborhood of a horizontal frequency of 2.5 MHz and FIG. 5C illustrates a time-vertical spectrum in the neighborhood of 3.5 MHz.

In FIG. 5C, regions on which hatching is made are unused regions. The horizontal bandwidth of the unused regions is 1 [MHz] and their vertical band ranges from 0 to 525 [cph]. On the unused regions is multiplexed the YHH component which has been shifted in frequency to a horizontal band of 3.3 to 4.1 MHz by the frequency shift circuit 18. The frequency-shifted YHH component is applied to the summing circuit 35 via the switch 34 where it is multiplexed on the above-described unused regions. In this case as well, the switch 34 is placed in the on state by the motion detector 32 only at the time of production of a still picture.

In this way an NTSC signal in which the YH and QH components are multiplexed is output from an output terminal 36.

Next, the arrangement of the demultiplexing side of FIG. 2 will be described.

In FIG. 2, 41 denotes an input terminal to which an NTSC signal is applied. The NTSC signal is separated by a Y/C separation circuit 42 into a Y signal and a C signal. The separated C signal is recovered by the Y/C separation circuit 42.

The C signal output from the Y/C separation circuit 42 is separated by a horizontal LPF 43 and a subtracter 44 into a CL component of a horizontal band of 0 to 0.5 MHz and a CH component of 0.5 to 1.5 MHz.

The CH component output from the subtracter 44 is applied to a matrix circuit 48 via a 1H delay circuit 45, a 262H delay circuit and a 263H delay circuit 47. Whereby, data a1, a2, a3 and a4 allocated to the horizontal scanning lines L1, L2, L3 and L4 as shown in FIG. 3 are applied to the matrix circuit 48 simultaneously.

The matrix circuit 48 performs a matrix operation which is the inverse of the matrix operation of the matrix circuit 20 of FIG. 1 on the data a1, a2, a3 and a4 to recover the YHL1, YHL2, QH and IH components. This inverse transformation is performed by such a Walsh matrix as represented by equation (2) that is exactly the same as equation (1).

$$\begin{pmatrix} IH \\ QH \\ YHL1 \\ YHL2 \end{pmatrix} = \frac{1}{2} \begin{pmatrix} 1 & 1 & 1 & 1 \\ 1 & -1 & 1 & 1 \\ 1 & 1 & -1 & 1 \\ 1 & -1 & -1 & 1 \end{pmatrix} \begin{pmatrix} a1 \\ a2 \\ a3 \\ a4 \end{pmatrix} \quad (2)$$

The YHL1 and YHL2 components recovered by the matrix circuit 48 are allocated to two horizontal scanning lines within one field by a selector 49 and a 1H delay circuit 50. The allocated outputs are further allocated to first and second fields of one frame by a selector 51 and a 262H delay circuit 52.

The horizontal band of the YHL component output from the selector 51 ranges from 0.5 to 1.5 MHz. The YHL component is applied to a frequency shift circuit 53 to be modulated with a carrier at 8/5 fsc. As a result, the YHL component is frequency shifted to the original horizontal band of 4.2 to 5.2 MHz.

The YHL component subjected to frequency shift by the frequency shift circuit 53 is applied via a switch 54 to a summing circuit 55 where it is added to the Y signal output from the Y/C separation circuit 42. The switch 54 is controlled by a motion detector 56. The motion detector 56 detects the extent of motion of a picture on the basis of the Y and C signals output from the Y/C separation circuit 42 and places the switch 54 in the on state in the case of a still picture and in the off state in the case of a motion picture. This is based on the fact that the YHL component is multiplexed only in the case of a still picture.

The IH and QH components output from the matrix circuit 48 are multiplexed with each other to produce a CH component. The CH component is allocated to two horizontal scanning lines of one field by a 1H delay circuit 67 and a selector 68. The allocated outputs are further allocated to the first and second fields of one frame by a 262H delay circuit and a selector 59. The allocated outputs are applied via a switch 60 to a summing circuit 61 where they are added to the CL output from the horizontal LPF 43. As a result, a C component of a horizontal bandwidth of 0 to 1.5 MHz is obtained, which is in turn output from an output terminal 62.

The switch 60 is placed in the on state only at the time of a still picture. This is based on the fact that the CH component is multiplexed only in the case of a still picture.

The NTSC signal applied to the input terminal 41 is further applied to a separation circuit 63. The separation circuit 63 separates the YHH component, which is multiplexed on the regions indicated by diagonal hatching in FIG. 5C, from the NTSC signal. The YHH component, which has a horizontal band of 3.3 to 4.1 MHz is returned to the original horizontal band of 5 to 6 MHz by a frequency shift circuit 64.

The YHH component output from the frequency shift circuit 64 is applied via a switch 65 to the summing circuit 55 where it is added to the Y signal and the YHL component. The switch 65 is placed in the off state only at the time of a still picture by the motion detector 56. This is based on the fact that the YHH component is multiplexed only at the time of a still picture. Consequently a broadband Y signal is obtained from the summing circuit 55 at the time of a still picture, which is in turn output from an output terminal 66.

According to the embodiment described in detail, the IH, YHL and QH components which are identical to one another in horizontal band can be multiplexed without being superimposed upon one another. This is based on the ground that each of the IH, YHL and QH components is positioned in a different vertical band by means of the vertical matrix operation.

Also, the original IH, YHL and QH components can be recovered from the data a1, a2, a3 and a4 obtained by the matrix operation. This is because the data a1, a2, a3 and a4 are allocated to the CL component, in other words, the four horizontal scanning lines L1, L2, L3 and L4 of one frame of an NTSC signal. That is, according to such an arrangement, since the data a1, a2, a3 and a4 are transmitted separated from one another to the recovering side, the IH, YHL and QH components can surely be recovered from the incoming data a1, a2, a3 and a4 at the recovering side.

In addition, the compatibility with the existing NTSC system can be maintained. This is because the QH, IH and YH components are multiplexed within the band of the C signal.

Furthermore, the compatibility with broadcasting equipment for the existing NTSC system can also be maintained. This is because the IH component is multiplexed in phase on the four horizontal scanning lines.

Figure 6:
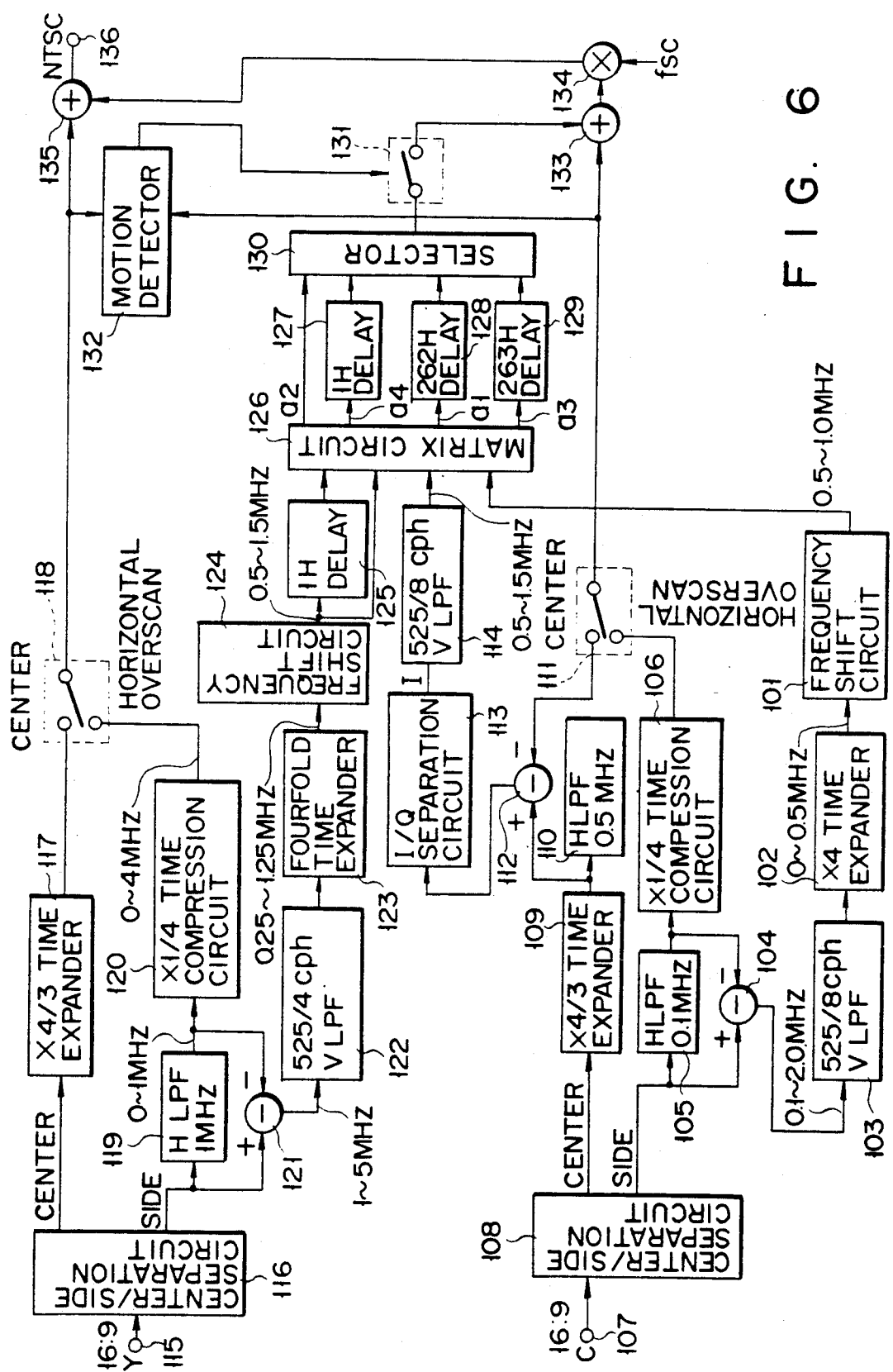
FIG. 6 is a block diagram of a multiplexer according to the other embodiment of the present invention.
Figure 7:
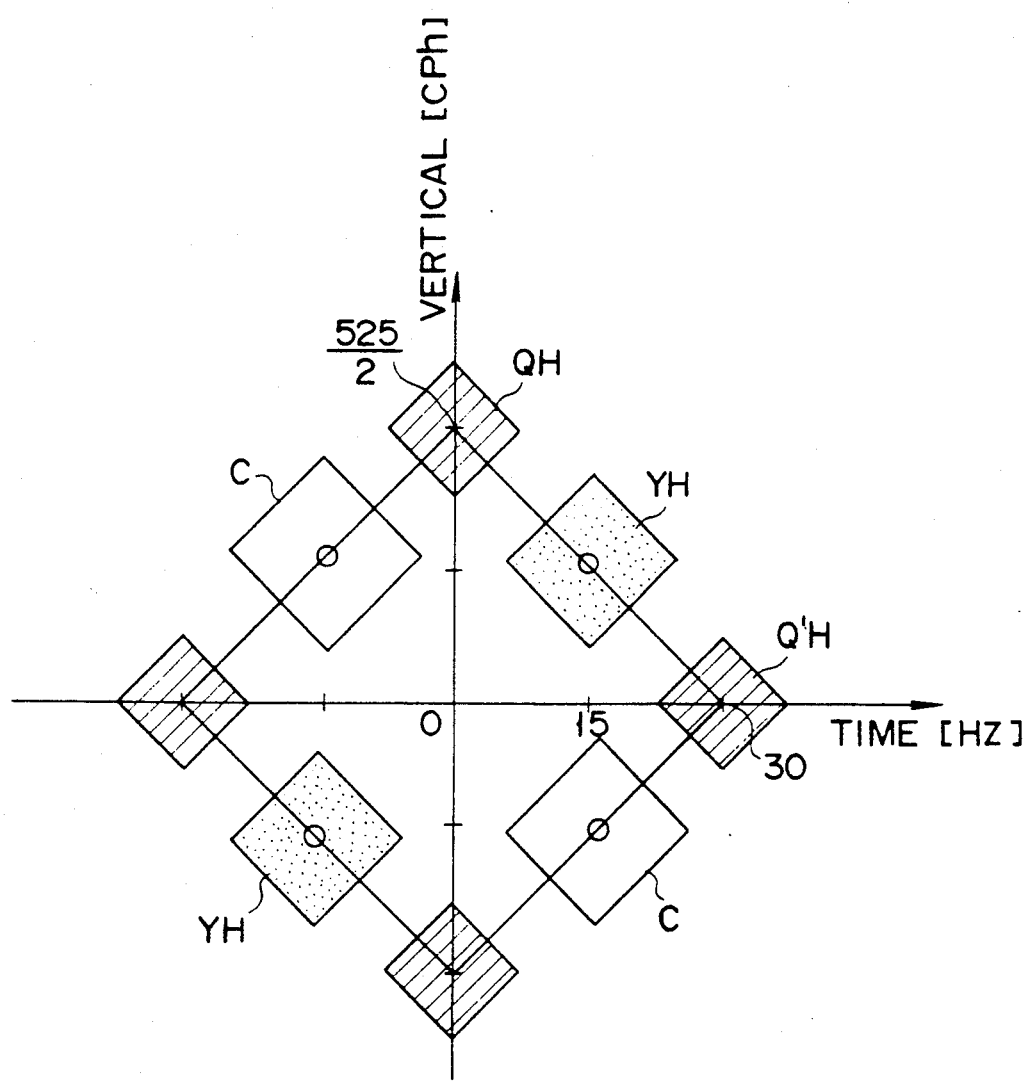
FIG. 7 is a spectrum diagram for explaining a conventional multiplexing system.

Next, a second embodiment of the present invention, that is, a transmitting and recovering system for processing aspect-ratio enlarging additional information will be described with reference to FIG. 6.

First, a luminance signal (Y) containing additional information on an aspect ratio of 16:9 is applied to an input terminal 115. The Y signal is separated by a center/side separation circuit 116 into a central signal corresponding to the central portion of a television picture and a side signal corresponding to side portions of the television picture. Here the aspect ratio of the central portion is set at 4 : 3. The time base of the separated central signal is expanded by a factor of 4/3 by a 4/3 time expander and then applied to a switch 118. On the other hand, the separated side signal is applied to a horizontal LPF 119 having a cutoff frequency of 1 MHz and a subtracter 121. A component of 0 to 1 MHz output from the horizontal LPF 119 is applied to a ¼ time compression circuit 120 and a subtracter 121. As a result, a 0- to 4-MHz component is output from the circuit 120 to the switch 118. The switch 118 operates to multiplex the 0- to 4-MHz component from the circuit 120 with the horizontal overscan portion of the output (center signal) from the circuit 117. Therefore, the switch 118 outputs a signal which is formed by multiplexing the 0-to 1-MHz component of the side signal, whose time base is compressed by a factor of 314, with the horizontal overscan portion of the center signal. The subtracter 121 subtracts the 0- to 1-MHz component from the side signal to output a 1- to 5-component. The component has its vertical region limited to 525/4 [cph] by a vertical-time LPF 122 and then is applied to a fourfold time expander 123. The circuit 123 expands the time base of the output of the circuit 122 by a factor of four to provide a 0.25- to 1.25-MHz component. The component is frequency shifted to a 0.5-to 1.25-MHz component by a frequency shift circuit 124 and then applied to a 1H delay line 125 and a matrix circuit 126. The delayed output of the circuit 125 is also applied to the matrix circuit 126.

To an input terminal 107 is applied a color difference signal (C) containing additional information on an aspect ratio of 16 : 9. The signal is separated by a center/-side separation circuit 108 into a central signal and a side signal. The time base of the central signal is expanded by a 4/3 time expansion circuit 109 by a factor of 4/3 and then applied to a horizontal LPF 110 having a cutoff frequency of 0.5 MHz and a subtracter 112.

On the other hand, the separated side signal is applied to a horizontal LPF 105 having a cutoff frequency of 0.1 MHz and a subtracter 104. The 0- to 0.1-MHz component from the circuit 105 is applied to a ¼ time compression circuit 106 and a subtracter 104. An 0- to 0.4-MHz component, which has been subjected to time base compression by a factor of ¼, is output from the circuit 106 to a switch 111. The switch 111 operates to multiplex the 0- to 0.4-MHz from the circuit 106 with the horizontal overscan portion of the 0- to 0.5-MHz component (center signal) from the circuit 110. The output of the switch 111 is applied to a summing circuit 133 and a motion detector 132. The output of the LPF 110 is also applied to the subtracter 112. The subtracter 112 subtracts the output of the LPF 110 from the output of the expansion circuit 113 to provide the result of the subtraction to an I/Q separation circuit 113. The vertical region of the I signal from the circuit 113 is limited to 525/8 [cph] by a LPF 114 so that a 0.5- to 1.5-MHz component is applied to the matrix circuit 126.

A 0.1- to 2.0-MHz component is output from the subtracter 104 and has its vertical band limited to 525/8 [cph] by a vertical-time LPF 103. The time base of the output of the LPF 103 is expanded by a factor of four by a fourfold time expansion circuit 102 to output a 0- to 0.5-MHz component. This output is frequency shifted to a 0.5- to 1.0-MHz component by a frequency shift circuit 101 for subsequent application to the matrix circuit 126.

The matrix circuit 126 performs a vertical matrix operation on the above-described four incoming components for transformation to four pieces of data a1 to a4. The data a4, a1 and a3 are delayed by delay lines 127 to 129 by 1H, 262H and 263H, respectively. A selector 130 selects one of the delayed outputs for sequential multiplexing on the horizontal scanning lines L1, L2, L3 and L4 of the selected output of the switch 111 in the summing circuit 133. An output signal of the summing circuit 133 is applied to a modulator 134 where it is modulated with a color subcarrier of the frequency fsc to produce a C signal having the color signal band of the NTSC system. The C signal is added to a selected output of the switch 118 by a summing circuit 135 and output from an output terminal 136 as an NTSC signal.

The motion detector 132 is responsive to the outputs of the switches 118 and 111 to detect the motion of a picture, thereby controlling the switch 131. That is, the switch 131 is turned on only in the case of a still picture, whereby a selected output from the selector 130 is multiplexed.

It goes without saying that the second embodiment has the same advantages and effects as the first embodiment.

Although the preferred embodiments of the present invention have been disclosed and described, it is apparent that other embodiments and modifications are possible.

For example, in the previous embodiments, a description was made of a case in which the matrix operation is performed in units of four horizontal scanning lines. Of course, in the present invention, the matrix operation may be performed in units of a different number of horizontal scanning lines.

In the previous embodiments, the multiplexing is performed only at the time of a still picture. In the present invention, however, as long as a multiplexing region is selected in a horizontal band in which no problem arises from the expansion of spectrum, the multiplexing may, of course, be performed in the case of a motion picture as well.

In the previous embodiments, television signals of the same horizontal band are multiplexed. However, the present invention may, of course, be applied to a matrix operation of plural components which are different from each other in horizontal band. That is, the present invention may be applied to a case where plural television signals, which are different from each other in horizontal band and identical to each other in vertical band, are multiplexed in different horizontal bands and different vertical bands.

According to the present invention, as described above, when plural television signals are identical to each other in horizontal band, they can be multiplexed on the same horizontal band without being superimposed upon each other and can be recovered from the resulting multiplexed signal.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A television signal multiplexing and demultiplexing system comprising:
   signal separating means for separating a composite color television signal into a plurality of first television signals serving as additional information for making the quality of a television picture higher and a second television signal;
   matrix operation means for vertically performing a fourth-order Walsh matrix operation on said plurality of first television signals separated by said separating means so as to dispose each of said first television signals in a different vertical band, thereby producing a plurality of operation outputs;
   delay means for delaying said plurality of operation outputs by different amounts of delay to provide delayed outputs;
   multiplexing means for multiplexing said delayed outputs from said delay means on different horizontal scanning lines of said second television signal to provide a multiplexed output signal;

demultiplexing means for demultiplexing said multiplexed output signal from said multiplexing means into said plurality of operation outputs and said second television signal; and recovering means for performing a matrix operation which is the inverse of said matrix operation performed by said matrix operation means on said plurality of operation outputs demultiplexed by said demultiplexing means to recover said plurality of first television signals.

2. A television signal multiplexing and demultiplexing system comprising:

signal separating means for separating a composite color television signal into a plurality of first television signals serving as additional information for making the quality of a television picture higher and a second television signal;

matrix operation means for vertically performing a matrix operation on said plurality of first television signals separated by said separating means so as to dispose each of said first television signals in a different vertical band, thereby producing four operation outputs;

delay means for delaying said four operation outputs by different amounts of delay to provide delayed outputs;

multiplexing means for multiplexing said delayed outputs from said delay means on different horizontal scanning lines of said second television signal to provide a multiplexed output signal;

demultiplexing means for demultiplexing said multiplexed output signal from said multiplexing means into said four operation outputs and said second television signal; and recovering means for performing a matrix operation which is the inverse of said matrix operation performed by said matrix operation means on said four operation outputs demultiplexed by said demultiplexing means to recover said plurality of first television signals.

3. A television signal multiplexing and demultiplexing system comprising:

signal separating means for separating a composite color television signal into a plurality of first television signals serving as additional information for making the quality of a television picture higher and a second television signal;

matrix operation means for vertically performing a matrix operation on said plurality of first television signals separated by said separating means so as to dispose each of said first television signals in a different vertical band, thereby producing a plurality of operation outputs;

delay means for delaying said plurality of operation outputs by different amounts of delay to provide delayed outputs;

multiplexing means for multiplexing said delayed outputs from said delay means on different horizontal scanning lines of said second television signal to provide a multiplexed output signal;

switch means connected between said delay means and said multiplexing means;

motion detecting means responsive to said composite television signal for detecting the motion of a television picture to control said switch means;

demultiplexing means for demultiplexing said multiplexed output signal from said multiplexing means into said plurality of operation outputs and said second television signal; and recovering means for performing a matrix operation which is the inverse of said matrix operation performed by said matrix operation means on said plurality of operation outputs demultiplexed by said demultiplexing means to recover said plurality of first television signals.

4. A system for multiplexing and demultiplexing a composite color television signal containing a luminance signal and color difference signals comprising:

first signal separating means for separating a first television signal serving as additional information adapted for making the quality of a picture higher from said luminance signal;

second signal separating means for separating a second television signal serving as additional information adapted for making the quality of a picture higher and a third television signal from said color difference signals;

matrix operation means for vertically performing a fourth-order Walsh matrix operation on said first and second television signals separated by said first and second signal separating means so as to dispose each of said first and second television signals in a different vertical band, thereby producing a plurality of operation outputs;

delay means for delaying said plurality of operation outputs by different amounts of delay to produce delayed outputs;

multiplexing means for multiplexing said delayed outputs from said delay means on different horizontal scanning lines of said third television signal to produce a multiplexed output signal;

demultiplexing means for demultiplexing said multiplexed output signal from said multiplexing means into said plurality of operation outputs and said second television signal; and recovering means for performing a matrix operation which is the inverse of said matrix operation performed by said matrix operation means on said plurality of operation outputs demultiplexed by said demultiplexing means to recover said first television signal.

5. A system for multiplexing and demultiplexing a composite color television signal containing a luminance signal and color difference signals comprising:

first signal separating means for separating a first television signal serving as additional information adapted for making the quality of a picture higher from said luminance signal;

second signal separating means for separating a second television signal serving as additional information adapted for making the quality of a picture higher and a third television signal from said color difference signals;

matrix operation means for vertically performing a matrix operation on said first and second television signals separated by said first and second signal separating means so as to dispose each of said first and second television signals in a different vertical band, thereby producing four operation outputs;

delay means for delaying said four operation outputs by different amounts of delay to produce delayed outputs;

multiplexing means for multiplexing said delayed outputs from said delay means on different horizontal scanning lines of said third television signal to produce a multiplexed output signal;

demultiplexing means for demultiplexing said multiplexed output signal from said multiplexing means into said four operation outputs and said second television signal; and recovering means for performing a matrix operation which is the inverse of said matrix operation performed by said matrix operation means on said four operation outputs demultiplexed by said demultiplexing means to recover said first television signal.

6. A system for multiplexing and demultiplexing a composite color television signal containing a luminance signal and color difference signals comprising:

first signal separating means for separating a first television signal serving as additional information adapted for making the quality of a picture higher from said luminance signal;

second signal separating means for separating a second television signal serving as additional information adapted for making the quality of a picture higher and a third television signal from said color difference signals;

matrix operation means for vertically performing a matrix operation on said first and second television signals separated by said first and second signal separating means so as to dispose each of said first and second television signals in a different vertical band, thereby producing a plurality of operation outputs;

delay means for delaying said plurality of operation outputs by different amounts of delay to produce delayed outputs;

multiplexing means for multiplexing said delayed outputs from said delay means on different horizontal scanning lines of said third television signal to produce a multiplexed output signal;

switch means connected between said delay means and said multiplexing means;

motion detecting means responsive to said composite television signal for detecting the motion of a television picture to control said switch means;

demultiplexing means for demultiplexing said multiplexed output signal from said multiplexing means into said plurality of operation outputs and said second television signal; and recovering means for performing a matrix operation which is the inverse of said matrix operation performed by said matrix operation means on said plurality of operation outputs demultiplexed by said demultiplexing means to recover said first television signal.

7. A television signal multiplexing system comprising:

signal separating means for separating a plurality of first television signals serving as additional information adapted for making the quality of a picture higher and a second television signal from a composite color television signal;

matrix operation means for vertically performing a matrix operation on said first television signals separated by said signal separating means so as to dispose each of said first and second television signals in a different vertical band, thereby producing four operation outputs;

delay means for delaying said four operation outputs from said matrix operation means by different amounts of delay to produce delayed outputs; and multiplexing means for multiplexing said delayed outputs from said delay means on different horizontal scanning lines of said second television signal to produce a multiplexed output signal.

8. A television signal multiplexing system comprising:

signal separating means for separating a plurality of first television signals serving as additional information adapted for making the quality of a picture higher and a second television signal from a composite color television signal;

matrix operation means for vertically performing a matrix operation on said first television signals separated by said signal separating means so as to dispose each of said first and second television signals in a different vertical band, thereby producing a plurality of operation outputs;

delay means for delaying said plurality of operation outputs from said matrix operation means by different amounts of delay to produce delayed outputs;

multiplexing means for multiplexing said delayed outputs from said delay means on different horizontal scanning lines of said second television signal to produce a multiplexed output signal;

switch means connected between said delay means and said multiplexing means; and motion detecting means responsive to said composite television signal for detecting the motion of a television picture to control said switch means.

9. A system for multiplexing a composite color television signal containing a luminance signal and color difference signals comprising:

first signal separating means for separating a first television signal serving as additional information adapted for making the quality of a picture higher from said luminance signal;

second signal separating means for separating a second television signal serving as additional information adapted for making the quality of a picture higher and a third television signal from said color difference signals;

matrix operation means for vertically performing a fourth-order Walsh matrix operation on said first and second television signals separated by said first and second signal separating means so as to dispose each of said first and second television signals in a different vertical band, thereby producing a plurality of operation outputs;

delay means for delaying said plurality of operation outputs from said matrix operation means by different amounts of delay to produce delayed outputs; and multiplexing means for multiplexing said delayed outputs from said delay means on different horizontal scanning lines of said third television signal to produce a multiplexed output signal.

10. A system for multiplexing a composite color television signal containing a luminance signal and color difference signals comprising:

first signal separating means for separating a first television signal serving as additional information adapted for making the quality of a picture higher from said luminance signal;

second signal separating means for separating a second television signal serving as additional information adapted for making the quality of a picture higher and a third television signal from said color difference signals;

matrix operation means for vertically performing a matrix operation on said first and second television signals separated by said first and second signal separating means so as to dispose each of said first and second television signals in a different vertical band, thereby producing four operation outputs;

delay means for delaying said four operation outputs from said matrix operation means by different amounts of delay to produce delayed outputs; and multiplexing means for multiplexing said delayed outputs form said delay means on different horizontal scanning lines of said third television signal to produce a multiplexed output signal.

11. A system for multiplexing a composite color television signal containing a luminance signal and color difference signals comprising:

first signal separating means for separating a first television signal serving as additional information adapted for making the quality of a picture higher from said luminance signal;

a second signal separating means for separating a second television signal serving as additional information adapted for making the quality of a picture higher and a third television signal from said color difference signals;

matrix operation means for vertically performing a matrix operation on said first and second television signals separated by said first and second signal separating means so as to dispose each of said first and second television signals in a different vertical band, thereby producing a plurality of operation outputs;

delay means for delaying said plurality of operation outputs from said matrix operation means by different amounts of delay to produce delayed outputs;

multiplexing means for multiplexing said delayed outputs from said delay means on different horizontal scanning lines of said third television signal to produce a multiplexed output signal;

switch means connected between said delay means and said multiplexing means; and motion detecting means responsive to said composite television signal for detecting the motion of a television picture to control said switch means.

* * * * *